US012628185B2

(12) United States Patent
Thubert et al.

(10) Patent No.: US 12,628,185 B2
(45) Date of Patent: May 12, 2026

(54) PREEMPTION SCHEDULING FOR RAW DETERMINISTIC TRAFFIC

(71) Applicant: Cisco Technology, Inc., San Jose, CA (US)

(72) Inventors: Pascal Thubert, Roquefort les Pins (FR); Jerome Henry, Pittsboro, NC (US); Juan Carlos Zuniga, Montreal (CA); Matthew A. Silverman, Shaker Heights, OH (US); Domenico Ficara, Essertines-sur-Yverdon (CH); Amine Choukir, Ecublens (CH); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 471 days.

(21) Appl. No.: 18/192,476

(22) Filed: Mar. 29, 2023

(65) Prior Publication Data

US 2024/0015768 A1 Jan. 11, 2024

Related U.S. Application Data

(60) Provisional application No. 63/367,978, filed on Jul. 8, 2022.

(51) Int. Cl.
*H04W 72/27* (2023.01)
*H04L 5/00* (2006.01)
*H04W 72/0453* (2023.01)
*H04W 72/56* (2023.01)

(52) U.S. Cl.
CPC ........... *H04W 72/27* (2023.01); *H04L 5/0055* (2013.01); *H04W 72/0453* (2013.01); *H04W 72/56* (2023.01)

(58) Field of Classification Search
None
See application file for complete search history.

(56) References Cited

U.S. PATENT DOCUMENTS

| | | | | |
|---|---|---|---|---|
| 2014/0355530 A1* | 12/2014 | Wen | ...................... | H04L 1/1628 |
| | | | | 370/329 |
| 2016/0330757 A1* | 11/2016 | Cherian | ................ | H04W 72/21 |
| 2017/0265135 A1 | 9/2017 | Cariou et al. | | |
| 2018/0255570 A1 | 9/2018 | Patil et al. | | |
| 2019/0191323 A1 | 6/2019 | Venkatesan et al. | | |

(Continued)

OTHER PUBLICATIONS

Mohammad Ashjaei et al., "A novel frame preemption model in TSN networks," Elsevier, Journal of Systems Architecture 116 (2021), pp. 1-15.

(Continued)

*Primary Examiner* — Srinivasa R Reddivalam
(74) *Attorney, Agent, or Firm* — Patterson + Sheridan LLP

(57) ABSTRACT

Techniques for managing communications between access points (APs) and stations (STAs) are described herein. In one embodiment, an AP broadcasts a trigger message to a plurality of STAs, the trigger message including a matrix defining a plurality of resource units (RUs) that the plurality of STAs are assigned to transmit or receive data, and a fragment flag. The presence of the fragment flag, within the scheduling matrix, informs the AP that the data transmission that the fragment flag is appended to is a partial transmission that will be completed in a subsequent transmission opportunity.

20 Claims, 6 Drawing Sheets

600 ⌐►

601 ⌐

Transmit a first message to a station (STA) indicating a fixed duration in a first resource unit (RU) that the STA can use to transmit data to the AP

602 ⌐

Receive, after transmitting the message to the STA, traffic in the first RU from the STA having a fragment flag, the fragment flag indicating the STA sent an incomplete packet during the fixed duration

603 ⌐

Transmit a second message to the STA indicating a second fixed duration in a second RU that the STA can use to transmit the remaining portion of the packet to the AP

(56) References Cited

U.S. PATENT DOCUMENTS

| | | | |
|---|---|---|---|
| 2020/0154500 A1 | 5/2020 | Zhou | |
| 2020/0281008 A1 | 9/2020 | Aboul-Magd et al. | |
| 2021/0219300 A1* | 7/2021 | Lou ...................... | H04W 72/23 |
| 2024/0008081 A1* | 1/2024 | Xia ..................... | H04W 74/085 |
| 2024/0306134 A1* | 9/2024 | Hu ....................... | H04L 5/0094 |

OTHER PUBLICATIONS

U.S. Appl. No. 18/192,306 "Flexible-Slot Scheduling for Raw Deterministic Traffic," filed Mar. 29, 2023.

"TSN Technology: Ethernet Frame Preemption, Part 1," industrial ethernet book, Dated: May 30, 2021, pp. 1-4.

\* cited by examiner

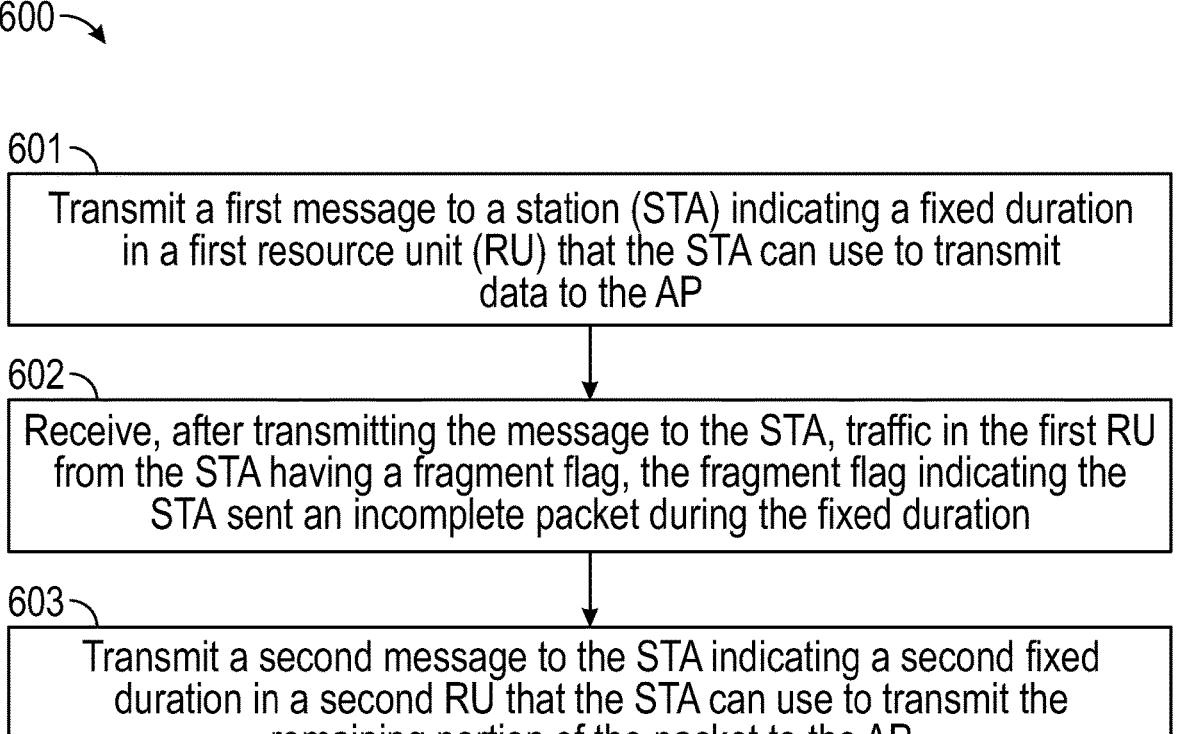

600

601
Transmit a first message to a station (STA) indicating a fixed duration in a first resource unit (RU) that the STA can use to transmit data to the AP 602
Receive, after transmitting the message to the STA, traffic in the first RU from the STA having a fragment flag, the fragment flag indicating the STA sent an incomplete packet during the fixed duration 603
Transmit a second message to the STA indicating a second fixed duration in a second RU that the STA can use to transmit the remaining portion of the packet to the AP

FIG. 6

PREEMPTION SCHEDULING FOR RAW DETERMINISTIC TRAFFIC

CROSS-REFERENCE TO RELATED APPLICATIONS

This application claims benefit of U.S. provisional patent application Ser. No. 63/367,978 filed Jul. 8, 2022. The aforementioned related patent application is herein incorporated by reference in its entirety.

TECHNICAL FIELD

Embodiments presented in this disclosure generally relate to techniques for managing Wi-Fi communications between access points and stations.

BACKGROUND

Time-Sensitive Networking (TSN) extends Wi-Fi communications with deterministic elements and time-sensitive capabilities. However, a short coming of TSN networking is handling partial data transmission with interrupts and pre-emption schemes. The embodiments described herein set forth a fragment flag that improves transmission interruption and pre-emption. TSN enables reliable and timely communication over networks by providing a suite of mechanisms and protocols that enable networked devices to exchange critical data with very low latency and high reliability. Some of the key features of TSN include: time synchronization, traffic scheduling, bandwidth reservation, and stream identification. One important aspect of TSN is Frame Replication and Elimination for Multipoint Applications (FREMA) pre-emption. FREMA preemption is a mechanism that enables a higher-priority stream to preempt a lower-priority stream during transmission in order to meet strict timing requirements. However, for Wi-Fi communications between Access Points (AP) and Stations (STAs), TSN and deterministic communications may benefit from improvements in data transmission interruption and pre-emption.

The implementation of TSN, in the context of Wi-Fi networks, relies on effective communication between APs and STAs. APs are devices that schedule the transmission of data to and from STA. STAs are devices that use data sent over the Wi-Fi network to carry out specific tasks. Some examples of STAs include personal computers, cellular phones, and servers. Because Wi-Fi transmission are not bound to cables or wires, each STA is unaware of transmission by other STAs and each STA tends to be unaware of the busy/idle state of the APs. Wi-Fi STA transmit a data frame and wait for an acknowledgement from the intended receiver that the data frame was received. If no acknowledgement is received, the STA can send the transmission again. The STA will repeatedly send transmission until an acknowledgement is received. There is a cost to repeatedly transmitting frames. Each retransmission attempt results in longer wait times between retransmissions that compound, creating greater and greater overhead costs. Another cost associated with the transmission of data over Wi-Fi networks is the efficient allocation of data frames to available RUs. If the data that could be transmitted is larger than an available time slot for assigned to an RU, then the data is not scheduled for transmission and the transmission opportunity is wasted. A similar cost is associated with data that is smaller than the time slot assigned to an RU. If the data is smaller than the size of the time slot assigned to an RU, then padding is inserted into the transmission to fill out the size of the time slot. The insertion of padding consumes resources that could be more efficiently allocated.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 6 illustrates a method according to an embodiment of the current disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
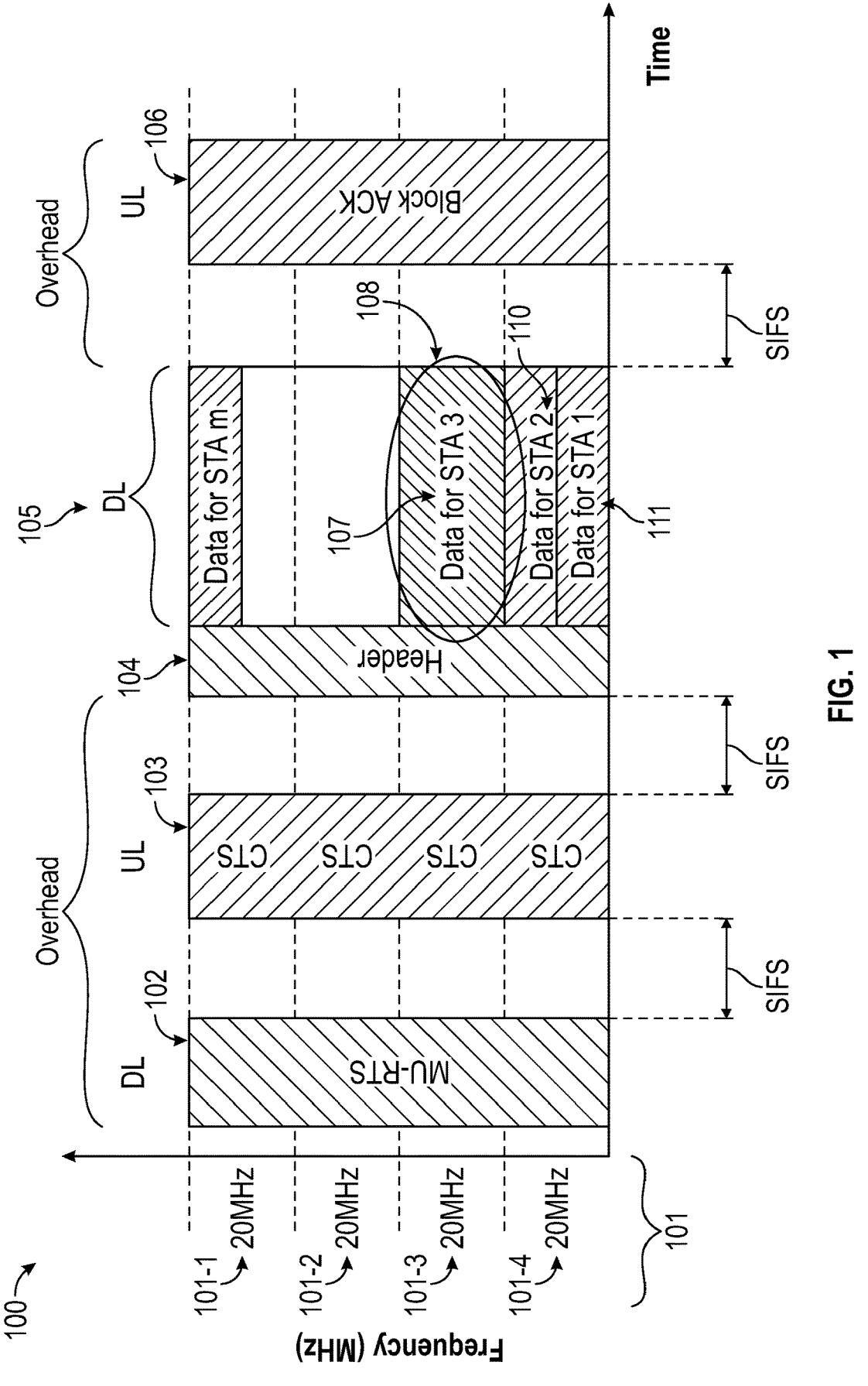
FIG. 1 illustrates a non-deterministic downlink transmission.

One embodiment presented in this disclosure includes an AP including a transmitter configured to transmit a first message to a STA indicating a fixed duration in a first RU that the STA can use to transmit data to the AP. After transmitting the message to the STA, the AP receives traffic in the first RU from the STA having a fragment flag, the fragment flag indicating the STA sent an incomplete packet during the fixed duration. The AP including a transmitter then transmits a second message to the STA indicating a second fixed duration in a second RU that the STA can use to transmit a remaining portion of the packet to the AP.

Another embodiment presented in this disclosure includes a method of data transmission, executed by an AP, that includes transmitting a first message to a STA indicating a fixed duration in a first RU that the STA can use to transmit data to the AP; receiving, after transmitting the message to the STA, traffic in the first RU from the STA having a fragment flag, the fragment flag indicating the STA sent an incomplete packet during the fixed duration; and transmitting a second message to the STA indicating a second fixed duration in a second RU that the STA can use to transmit a remaining portion of the packet to the AP.

Another embodiment presented in this disclosure includes an AP configured to execute instructions stored in a non-transitory computer readable medium, the instructions comprising: transmitting a first message to a STA indicating a fixed duration in a first RU that the STA can use to transmit data to the AP; receiving, after transmitting the message to the STA, traffic in the first RU from the STA having a fragment flag, the fragment flag indicating the STA sent an incomplete packet during the fixed duration; and transmitting a second message to the STA indicating a second fixed duration in a second RU that the STA can use to transmit a remaining portion of the packet to the AP.

EXAMPLE EMBODIMENTS

The embodiments described herein improve Wi-Fi data transmission by a pre-emption technique and eliminates the requirement for padding or strict alignments for scheduled uplink transmissions. The embodiments described herein also support deterministic traffic transmissions and provides the tools needed to handle higher priority traffic that may or may not be expected and that could pre-empt lower priority traffic. The embodiments described herein can also improve the efficiency of TSN.

One embodiment presented in this disclosure includes a device configured to broadcast a trigger message to a plurality of STAs, the trigger message including a matrix defining a plurality of resource units (RUs), a time slot that the plurality of STAs are assigned to transmit or receive data, and a fragment flag. By defining the time and a RU tone, the device provides complete information for scheduling and identifying arriving data packets. The presence of the fragment flag informs an AP that the data transmission will not be completed on the current transmission opportunity (TXOP) and will resume on the next or a subsequent TXOP. The inclusion of the fragment flag, for any given partial transmission, also informs the sending AP that the transmission will not be acknowledged until the next or a subsequent TXOP.

The interruption of the transmission is, therefore, scheduled and expected. The AP now has available to it an interruption and preemption technique where preemption is based on the approaching end of the time slot. At the end of a time slot, the STA inserts a fragment flag that signals the segment that cannot be completed within the allocated time slot and the transmission will be resumed and completed in a time slot allocated during a subsequent TXOP.

In addition to facilitating the interruption of data transmissions, the fragment flag can also signal the preemption of a non-express segment, by resuming transmission with an express segment instead of continuing the transmission of the non-express segment.

An important role of the STA/AP communication scheme is the assurance that data is efficiently and completely transmitted both to and from the STAs. A fixed duration transmission, referred to as a TXOP, defines a time period during which data can be from a STA to an AP or from an AP to a STA. To begin the communication process, an AP broadcasts a trigger frame to the STAs announcing the beginning of the TXOP. The trigger frame allocates RUs to STAs. Any STA allocated to a specific RU attempts to fit into the assigned RU the traffic it has to send. If the amount data to send is larger than the size of the RU, then the STA cannot use the RU.

Conversely, a STA may have data to transmit but the amount of data to be transmitted is less than the entirety of the TXOP. In this situation, because the data size and the TXOP are not closely aligned, the portion of the TXOP that exceeds the size of the data is filled with data. The process of filing out the TXOP is known as padding the TXOP. Padding the TXOP includes filling the unused portion of the TXOP with filler data. Because the filler data is not used, padding the TXOP wastes the padded out portion by transmitting filler data. The inclusion of padding data with the STA data wastes airtime resources for the remainder of the transmission duration. The use of padding data is particularly problematic when the STA is mobile.

Data priority also informs which STAs are allocated RUs. Data can be assigned a priority allowing the transmission of the prioritized data ahead of data that could be scheduled for transmission during the same TXOP. There are several different ways to assign priority to data. One priority assigned is the classification of data as scheduled traffic or non-scheduled traffic. Scheduled traffic is a transmission that is scheduled offline by a static schedule. The transmission of scheduled traffic takes priority over non-scheduled traffic. Traffic can also be prioritized as either pre-emptable or express. The transmission of pre-emptable traffic can be interrupted and pre-empted by a transmission of express traffic.

In context of deterministic transmissions, where the time data is to arrive is scheduled, prioritization, interruption, and pre-emption schemes present scheduling issues. Deterministic data may be interrupted by scheduled traffic or pre-empted by express traffic. On the subsequent TXOP the deterministic data may, again, miss its opportunity to be transmitted. The AP is aware of this situation and can assign a higher priority to the delayed data transmission. However, this data may not be assigned a priority high enough to ensure its transmission on the next TXOP. The inability of the AP to timely schedule the transmission of delayed data is significant because the delayed data should be transmitted within a certain time period in order for the data to be useful at the receiving AP. Therefore there is a need to continue the transmission of STA data during a subsequent TXOP to complete the data transmission.

To solve these issues, it may be tempting to assign large RUs, thus reducing the number of scheduled STAs to ensure that the STAs that are scheduled can effectively complete their segment transmission within the TXOP. However, such calculation is inefficient when there are many STAs, as it delays the transmission of the next STAs. If parallelization is to be optimized, there can be a short fixed duration between the trigger frame and the AP communication. Therefore it is tempting to schedule many STAs in parallel with smaller RUs and shorter TXOPs.

The embodiments described herein overcome the inefficiencies and problems of Wi-Fi pre-emption and interruption schemes by the insertion of an interruption and preemption fragment flag. The fragment flag allows preemption based on the forthcoming end of time slot, allowing a STA to send a segment that cannot be completed within the allocated time slot and resuming its transmission in the next time slot. The fragment flag also allows preemption of non-express traffic by resuming transmission with an express segment instead of continuing the transmission of the non-express segment. When the end of the time slot allocated in the matrix is near for a given STA, the transmission is sett-preempted and resumes on the next time slot which the AP schedules together with the retries in echo triggers. Thus the STA starts its transmission within the allocated initial RU even if the data segment is too large to complete within the allocated slot. The AP will be able to reassemble the content of the original frame and deliver it as a whole data transmission. The fragment flag streamlines the reassembly of the data transmission because the fragment flag avoids the process of acknowledging each transmission and verifying the content before re-assembly.

The fragment flag addresses interruption inefficiencies. The inclusion of the fragment flag informs the AP that the data transmission is not to be interrupted by scheduled traffic and cannot be interrupted by non-scheduled traffic. In short, the fragment flag pre-empts both scheduled traffic and non-scheduled traffic. Blocking the ability of scheduled traffic and non-scheduled traffic to interrupt the fragment flagged transmission allows the transmission of all the data, over both TXOPs, to be completed within the time allotted for all TXOPs. The preemption is based on the forthcoming end of time slot, allowing a STA to send a segment that cannot be completed within the allocated time slot and resuming the transmission in the next time slot. The embodiments described herein preempt both the scheduled traffic and non-scheduled traffic. When non-scheduled traffic was preempted and scheduled traffic is available at the next time slot, the schedule traffic is scheduled for transmission before the non-scheduled traffic. Scheduled traffic that was preempted by a transmission associated with a fragment flag will be the next to be transmitted.

The fragment flag also allows a STA to preempt express segments. In a first TXOP, a data transmission may be classified as a non-express segment. During scheduling for the first TXOP, the AP can identify a data segment that may be only partially transmitted, and the fragment flag is added to the time slot. The fragment flag identifies the partial transmission as one that may be completed during a subsequent TXOP. In this instance, the fragment flag is appended to the first schedule informing the AP that the transmission will continue on a subsequent transmission. This also informs the AP that the time slot in the subsequent transmission, which completes the earlier partial transmission, is assigned an express classification. The assignment of an express classification to the second transmission, which completes the earlier partial transmission, ensures that the remainder of the transmission is completed without interruption during the subsequent transmission. The fragment flag informs that AP that the data transmission for the appended time slot will resume as an express segment instead of continuing the transmission as a non-express segment. In one embodiment, the fragment flag is appended to the RU assigned to a STA and is sent in a trigger message that is a matrix scheduling transmissions for a plurality of STAs. The trigger message can pull a number of adjacent deterministic time slots in different RUs, expressing the expected receptions as a time/RU matrix. The fragment flag can be an appropriate data structure such as a micro-Cyclical Redundancy Check (m-CRC) segment.

FIG. 1 illustrates a non-deterministic downlink transmission 100. A non-deterministic transmission is a Wi-Fi transmission where the AP and STAs are not given a schedule defining data transmissions by time and RU. Current Wi-Fi communication relies on non-deterministic devices and methods to facilitate communication between STA and APs. Non-deterministic down-link transmission 100 includes a multi-user request to send (MU-RTS) message 102, a clear to send (CTS) message 103, a header 104, multi-user downlink data frame 105, and a block acknowledgement 106.

For non-deterministic downlink transmission 100, an AP can first send a MU-RTS message 102, indicating for each target station (STA-1, STA-2, STA-3, etc.) the RU 101-1 thru 101-4 the AP is going to use to transmit. For example, for target station 3 (STA-3) the AP is going to transmit on RU 101-3. For example, a RU is a specific amount of frequency bandwidth that is allocated to a particular wireless device for communication.

The target STA respond in parallel in a multi-user response, indicating CTS 103 to acknowledge the announced downstream transmission. The AP then sends a multi-user downlink data frame 105 with the target data in the announced resource for each STA. The target data (e.g., target data 107) consumes the entire RU allocated for each STA. For example, the target data 107 for RU 101-3 utilizes the entire resource 108 for RU 101-3 assigned for multi-user downlink data frame 105. In this embodiment, the entire time period allocated to the RU for the data frame is allocated to a single STA. Although in this example a STA is allocated the full time for a RU, a STA can be allocated a division of the frequency bandwidth. For example, within downlink data frame 105, data for STA 2 110 and data for STA 1 111 are allocated bandwidth of the RU that is split by frequency but occupies the entire time slot. In this example, the data for STA 1 and STA 2 cannot occupy less than the full time for RU 101-4. After the transmission completes, the AP sends a block acknowledgement request (not depicted) to confirm if each client received the transmission successfully. If the data frames were received successfully, the clients respond with a block acknowledgement 106 in parallel. For non-deterministic downlink transmission, the MU-RTS 102, CTS 103, block acknowledgement request, and block acknowledgement are overhead consuming system resources, bandwidth, and time.

Figure 2:
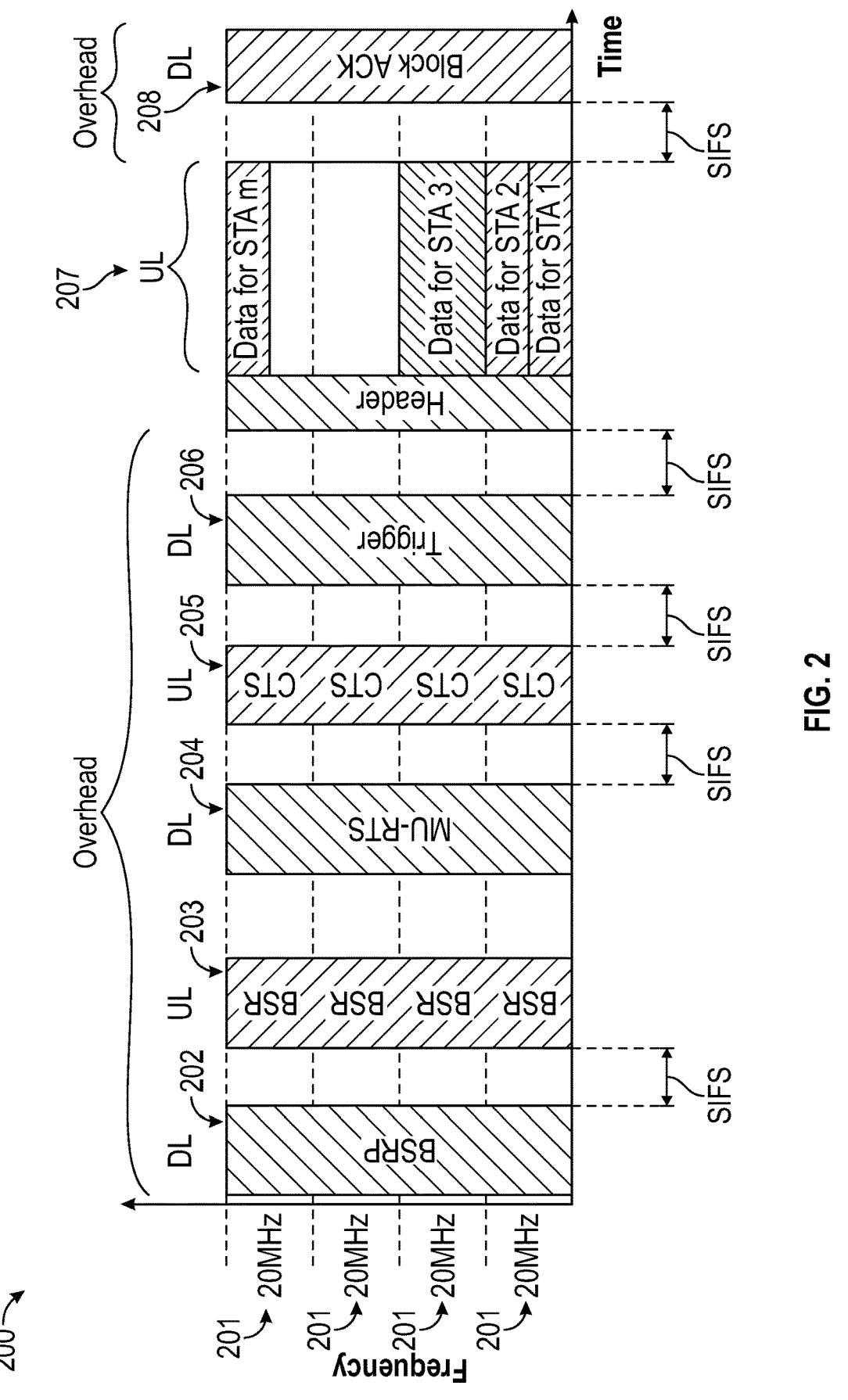
FIG. 2 illustrates a non-deterministic uplink transmission.

FIG. 2 illustrates non-deterministic uplink transmission 200. For non-deterministic uplink transmissions 200, an AP is expected to first obtain the BSR 203 for all STA. The BSR 203 can be sent individually by each STA with a single user uplink frame. In this example, the single user uplink frame consumes the entire channel. The BSR can also be clubbed in another uplink aggregate MAC protocol data unit (AMPDU). The AP can also send a request to a set of target STA (BSR Poll) 202, allocating to each one a RU 201 to return their BSR 203. In one embodiment, the STA respond in parallel in a multi-user request to send response.

The AP then knows which STA has which traffic to send. In response, the AP sends a MU-RTS frame 204 to the target clients, with the allocation of RUs 201 for their data transmission. All STA respond in parallel in a multi-user response, indicating CTS 205 to acknowledge the allocated upstream RUs. The AP then sends a trigger frame 206 to start the client transmission. The target clients can respond in parallel with data in their respective RUs 207. If the data frames were received successfully, the AP responds with a group block acknowledgement 208. Each of the BSR Poll 202, the BSR 203, the MU-RTS frame 204, CTS 205, and trigger frame 206 represent overhead consuming time and bandwidth.

In a non-deterministic system, uplink (UL) and downlink (DL) transmissions can include multiple rounds of transmission creating inefficiencies and wasting resources. This occurs because the size of the STA transmission is not known to the AP. The coordination of non-deterministic systems, therefore, includes a large overhead to communicate the data that is sent. This overhead includes communication in the form BSRP, BSR, MU-RTS, CTS, and a trigger message. Embodiments herein improve both UL and DL transmissions by eliminating overhead, reducing congestion losses, and decreasing jitter.

Figure 3:
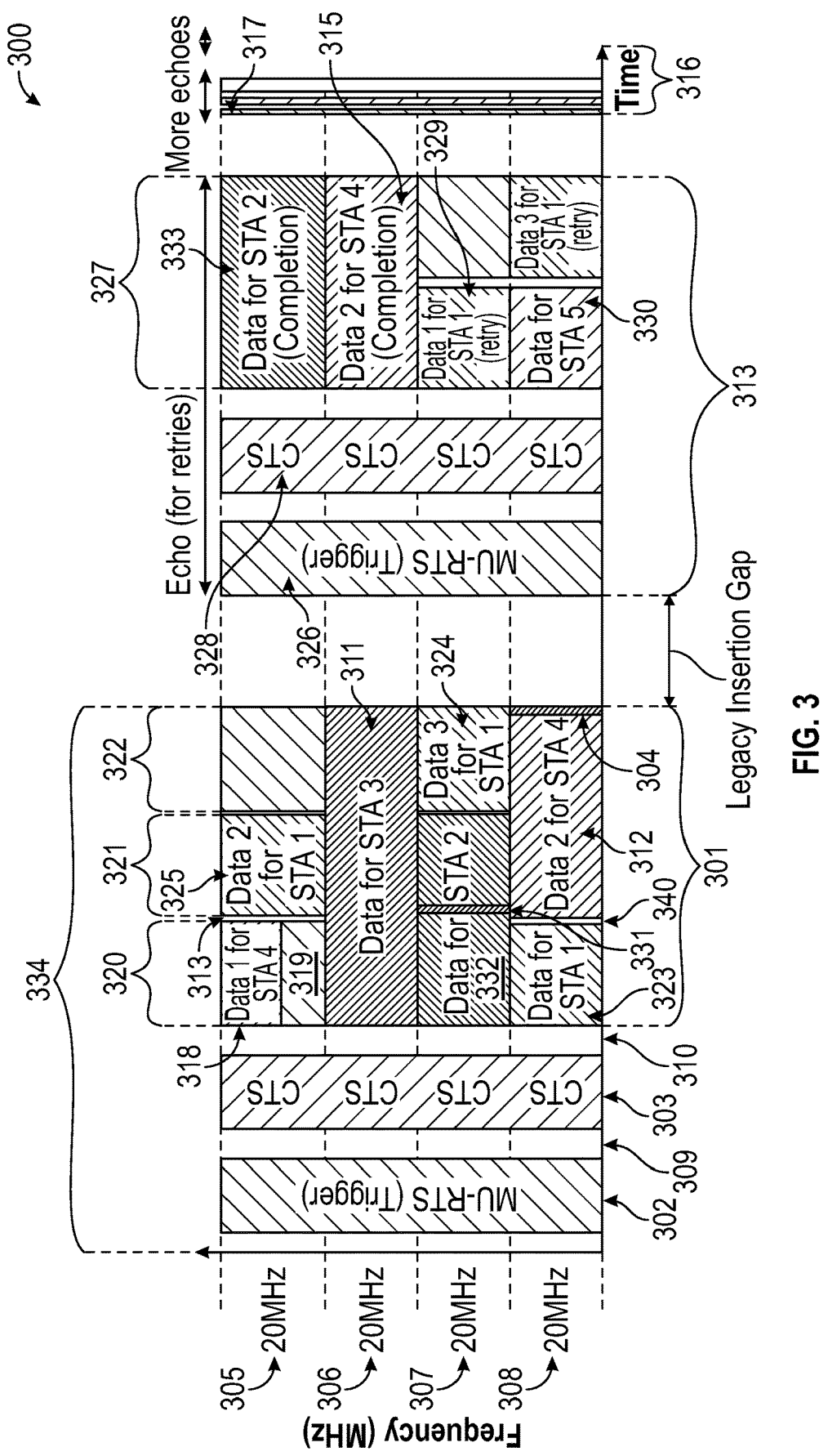
FIG. 3 illustrates a deterministic data communication with a fragment flag according to an embodiment of the current disclosure.

FIG. 3 illustrates a deterministic data communication including the fragment flag, according to one embodiment. The devices and methods described herein are designed to overcome the inflexibility, inefficiencies, and problems of current WIFI communications. The embodiment described herein includes an optional MU-RTS trigger 302, an optional CTS message 303 (depending on whether the MU-RTS trigger 302 is sent), matrix 301, and fragment flag 304. The MU-RTS trigger 302 may be separated from the CTS message 303 by a short inter-frame space (SIFS) 309. SIFS denote the amount of time in microseconds used by a wireless interface to process a received frame. The CTS message 303 may also be separated from the matrix 301 by a second SIFS 310. Timeslots, which are the RU and time allocations for each data, can be assigned to one STA in isolation or in sequence. Matrix 301 includes multiple time slots occupied by a plurality of data from a plurality of STAs. For example, Data for STA 3 (311) is assigned to RU 306 and a time slot that spans the time period of matrix 301. Data 2 for STA 4 (e.g., an incomplete packet 312) is assigned to RU 308, is appended with fragment flag 304, and does not span the entire time period of matrix 301. When timeslots are assigned in sequence, each time slot is separated from a prior and/or subsequent time slot by a micro-SIFS 340.

Within the first TXOP 334, the fragment flag 304 is appended to Data 2 for STA 4. As the end of the assigned slot nears, the STA inserts the fragment flag 304 in its transmission. This informs the AP to expect the continuation of the incomplete packet 312 in a retry 313 (or echo). The fragment flag 304 signals the transmission is self-preempted and resumes on the retry 313. Data 2 for STA 4 is assigned a time slot 315 in the second matrix 327. The fragment flag 324, therefore, signals to the AP that the remainder of Data 2 for STA 4 (e.g., the time slot 315) is scheduled with retries (313, 316) in an echo trigger 317 within the same round. Thus the STA starts its transmission within the allocated initial RU 308, even though the data segment is too large to complete within the allocated slot.

FIG. 3 also illustrates self-preemption before the end of a TXOP. Self-preemption can occur in any time/frequency slot at any point in time. A STA may preempt a transmission by inserting a preemption flag within a TXOP. Such preemption opens up time for use by the STA to switch to a different type of traffic. For example, the portion of the RU that is now free can be re-assigned to a different priority traffic for the STA. Further, if a STA is given more than one RU/timeslot, self-preemption across multiple channels can occur and the combined bandwidth can be used for a single express frame.

A preemption flag 331 is transmitted in the middle of the Data for STA 2 (332). For example, in the first portion of the TXOP, the STA 2 may transmit non-express traffic to the AP, but then decide it has express traffic ready to send to the AP. The STA 2 can transmit the preemption flag 331 (e.g., a mCRC) to inform the AP that the STA 2 is switching to a different type of traffic (e.g., from non-express to express). In this manner, the STAs can uses different portions of the TXOPs to preempt some types of traffic for other types of traffic.

Moreover, FIG. 3 also illustrates that the STA 2 is assigned a TXOP 333 in an echo transmission (which is discussed in more detail below). The STA 2 could also insert a preemption flag in the middle of that TXOP 330. For example, the STA 2 may finish sending the express traffic to the AP before the TXOP 333 has completed, in which case, the STA can transmit another preemption flag and switch from sending the express traffic back to transmitting the non-express traffic to the AP.

The schedule matrix also permits flexibility of assignment. Initial and subsequent time slots for data transmission are not required to mirror one another. Instead, the AP can assign any available time slot to the initial transmission and the AP can assign any available subsequent time slot to complete the self-preempted transmission. For example, in the first matrix 301, Data 2 for STA 4 is assigned to RU 308. In the subsequent matrix in the echo MU-RTS trigger 326, which completes the transmission of Data 2 for STA 4 (e.g., the time slot 315), the transmission is assigned to RU 306.

The time and frequency matrix 301 includes a plurality of time windows, aligned in a time division multiplexing (TDM) fashion. Each time window includes time slots (e.g., time durations). The size of the time slot corresponds with an amount of time used to transmit the corresponding data frame (e.g., Data 2 for STA 4). The embodiments described herein are not limited to a single slot size. This allows the embodiments described herein to customize the size of the time slot to the size of the data frame. RUs 305-308 denote groups of bandwidth subcarriers (tones). Therefore, the matrix 301 has a height described by a plurality of RUs 305-308 and a width described by time. Although FIG. 3 denotes four RUs, the number of RUs within the matrix depends upon the bandwidth of the transmission signal. For example, there may be a maximum of 9 RUs for 20 MHz bandwidth and 18 RUs for 40 MHz bandwidth. Further divisions of bandwidth into RUs are defined in IEEE 802.11. Thus the AP can schedule several consecutive transmit (XMIT) opportunities (TXOPs) with a single trigger frame.

The matrix 301 is a two-dimensional deterministic data frame for transmitting data. MU-RTS trigger 302 includes a schedule for transmitting the data that corresponds to matrix 301. The schedule for sending a data frame (e.g., Data 2 for STA 1) from one or more APs and for receiving a data frame by one or more APs is transmitted as a MU-RTS trigger 302. The schedule corresponding with the matrix 301 is shared between receiving and transmitting APs to coordinate the transmission of data. Accordingly, the MU-RTS trigger 302 reflects the content and size of a corresponding data frame described by matrix 301.

The matrix 301 has depth and width. The matrix's depth is measured in frequency (MHz). The frequency division reflects the bandwidth for each RU 305-308. For example, each of RUs 305-308 may be a 20 MHz band. Additional bands for RUs 305-308 such as 40 MHz, 80 MHz, and 160 (80+80) MHz can also be utilized.

Each of the RUs 305-308 can be further sub-divided by frequency into smaller frequency bands. For example, the first time slot entry for RU 305 is sub-divided into a first smaller frequency band 318 and a second smaller frequency band 319.

RUs 305-308 can also be further sub-divided into individual time slots. For example, RU 305 schedules time slot Data 1 for STA 4 at a first time period 320, time slot Data 2 for STA 1 at the next time period 321, and a third time slot 322 where no data transmission is scheduled. Each time slot is separated by a micro-inter frame space (µIFS) 340. Together Data 1 for STA 4, Data 2 for STA 1, the µIFSs, and the empty set time slot consume the allocated resource for RU 305.

The schedule and corresponding matrix 301 allows flexibility with response to a size of the data packets and the corresponding time slot that can be transmitted. This permits the AP to schedule a data packet for a particular STA that is less than the entire time allocated to the RU. The schedule and matrix 301 include subdivisions for each RU. For example, the time scheduled for Data 1 for STA 4 is less time than Data 2 for STA 4 305 scheduled in RU 308. In contrast, the transmission schemes illustrated in FIGS. 1 and 2 would utilize the entire time period allotted to RU 305 to transmit or receive Data 1 for STA 4. Similarly, using the scheme illustrated in FIGS. 1 and 2, the Data 2 for STA 4 would consume the entire time allotted to RU 308. Therefore, matrix 301 defines a schedule for data transmission where data packets are assigned both a RU and time slot in a more efficient manner permitting a single data frame to be more densely packed with data and allowing a greater number of data packets to be sent.

Because the AP has the schedule before the data is transferred, the receiving AP can identify each data packet as it arrives by the time of arrival and the RU it arrives on. Also, the receiving AP can identify any fragment flags, which informs the AP that the complete data transmission will occur over two or more TXOPS. Similarly, a sending AP can have a matching schedule that permits it to synchronize the transmission of the data, according to the scheduling matrix. When the schedule is received by an AP that will receive the data scheduled by matrix 301, the AP has a complete picture of the sequences of data, when each data packet will arrive, and the RU that will send the data. Therefore, each AP is able to efficiently and effectively coordinate the sending and receiving of data packets without the BSR polls 202, BSRs 203, and trigger frame 206. In one embodiment, the matrix 301 operates as a pull-trigger that lists traffic the AP receives and the time the traffic arrives at the AP. The matrix 301 indicates to the AP which RU and a time offset for the flow of data packets arriving at the AP according to the deterministic schedule included with MU-RTS trigger 302.

For example, FIG. 3 depicts a consecutive time slot transmission for STA 3. Data for STA 3 311 occupies a single RU spanning the width of the time and frequency matrix 301. FIG. 3 also depicts a non-contiguous transmission for STA 1. Data 1 for STA 1 (323) is non-contiguous with respect to time with Data 2 for STA 1 (324), and is not contiguous with respect to time with Data 3 for STA 1 (325). Note that the data for STA 3 is also non-contiguous in both time and frequency. Data 1 for STA 1 (323) occupies a different RU from Data 2 for STA 1 (324) and from Data 3 for STA 1 (325). The present disclosure permits division of scheduling for any STA with respect to both time and frequency. This allows for a more efficient data transfer by allowing the AP to fully utilize the entirety of a data frame.

Deterministic traffic does not mean that delivery has to be guaranteed, but that the delivery time should be known. The present embodiment addresses transmission completion and transmission loss by scheduling additional MU-RTS triggers 326. The retries 313, 316 may also be known as echoes. The AP is aware of the deterministic schedules in the matrix 301 and the affordable amount of jitter. An additional matrix 327 may be sent within the time set by acceptable jitter times. Therefore, additional triggers may be sent, to pull again the deterministic packets that complete partial transmissions (e.g., incomplete packet 312) and transmission that were lost. Finally, re-transmissions can also be used to send additional data. For example, retry 313 includes Data for STA 5 (330), which is the first time that the Data for STA 5 (330) is scheduled for transmission.

The completion of any partial transmission and re-transmission of any lost transmission is accomplished by following the initial data frame with a second MU-RTS trigger 326 scheduling the transmission of additional data frames. A block acknowledgement message informs that AP of any data packets requiring re-transmission. However, for any transmissions associated with fragment flag 304, the AP already is informed the incomplete packet 312 is a partial transmission. Therefore, fragment flag 304, informs the AP that matrix 327 should schedule a transmission to complete the partial data transmission. Therefore, the AP is not required to wait for an acknowledge message in order to schedule a time slot 315 for receiving the rest of the data for STA 4. Prior to receiving any acknowledge message, the AP can assign an RU and time slot to complete the partial transmission. An additional CTS 328 may also be sent. The second MU-RTS trigger 326 schedules for transmission the data frames included within matrix 327. The second matrix 327 may be sent with the same MU-RTS trigger 302 as the initial transmission or it may be sent with its own MU-RTS trigger 326. For deterministic traffic, the second MU-RTS trigger 326 is sent periodically at the granularity of the deterministic service, and the STAs response includes the top of queue packets and the RU size needed. Queued packets can be assigned to the matrix by priority with packets that complete a packet included a fragment flag assigned the highest priority. Deterministic packets can be assigned the next highest priority. The AP sorts the packets, assigns the most important packets, and allocates RUs according to the needs of the packet assigned for completion or re-transmission. Because the AP is aware of multiple deterministic schedules and the AP is aware of the amount of time for affordable jitter, the AP can pack more than one flow in one trigger. The second matrix 327 and any additional matrices sent as additional retries 316 include previous traffic that was not received and the completion of any transmissions containing a fragment flag. When several retry matrices are sent in sequence (e.g., several echoes), each time there are less missing packets so the matrix can be shorter in time. This is illustrated by the second matrix 327 have a shorter duration than the matrix 301. Any additional retries 316 include an MU-RTS trigger, CTS, and matrix as described herein.

The embodiments described herein illustrate the flexibility of the scheduling matrix included within the MU-RTS trigger. For example, the Data 1 and Data 3 for STA 1 require re-transmission. In the initial matrix, Data 1 for STA 1 319 was assigned transmission on RU 308. In the second matrix 327, Data 1 for STA 1 329 can be assigned any RU that has a time slot available for re-transmission. As depicted in FIG. 3, rather than scheduling the transmission of Data 1 for STA 1 on RU 308, the re-transmission is scheduled for RU 307. Here, the AP is not constrained to re-schedule transmission on the same RU initially assigned to Data 1 for STA 1. Instead the AP can use any available RU. Moving the Data 1 for STA 1 in the echo to a different RU may be advantageous to potentially avoid interference that results in the data not being received on the RU in the previous matrix. In this way, the AP can maximize the data frames for re-transmission which efficiently packs data transmissions into available resources.

The second retry 313 or additional retries 316 can also be used opportunistically to schedule data frames for a first transmission. As illustrated in FIG. 3, matrix 327 includes a first transmission for Data for STA 5. Because the schedule for transmission is included in the second MU-RTS trigger 326, an AP can assign any RU having an available time slot.

Re-transmission efficiently allocates resources by decreasing the size of the corresponding matrix. For example, the time to transmit the data in matrix 327 is less than the amount of time to transmit in matrix 301. By reducing the amount of time used to re-transmit additional data frames, retries 313 and 316 consume less time and less resources. This permits re-transmission of any lost data within the amount of affordable jitter as well.

Figure 4:
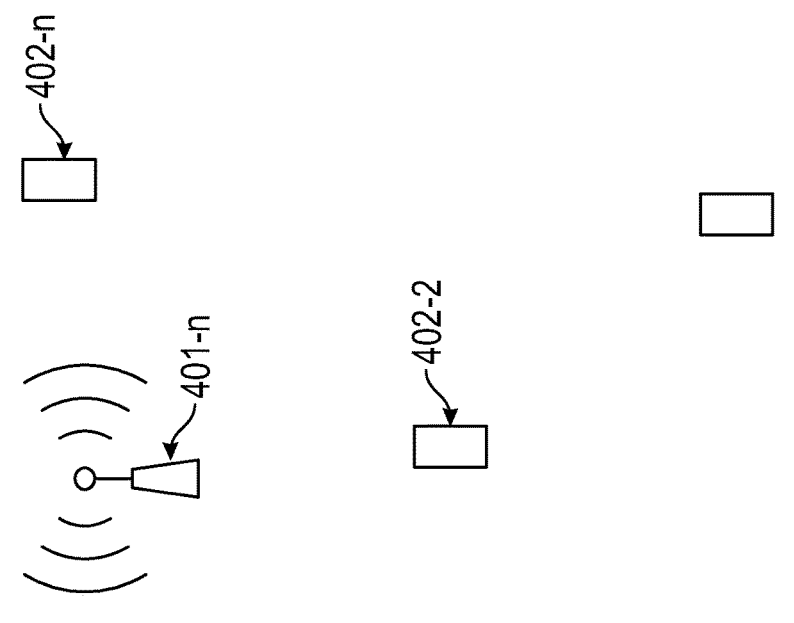
FIG. 4 illustrates a wireless network according to an embodiment of the current disclosure.
Figure 4:
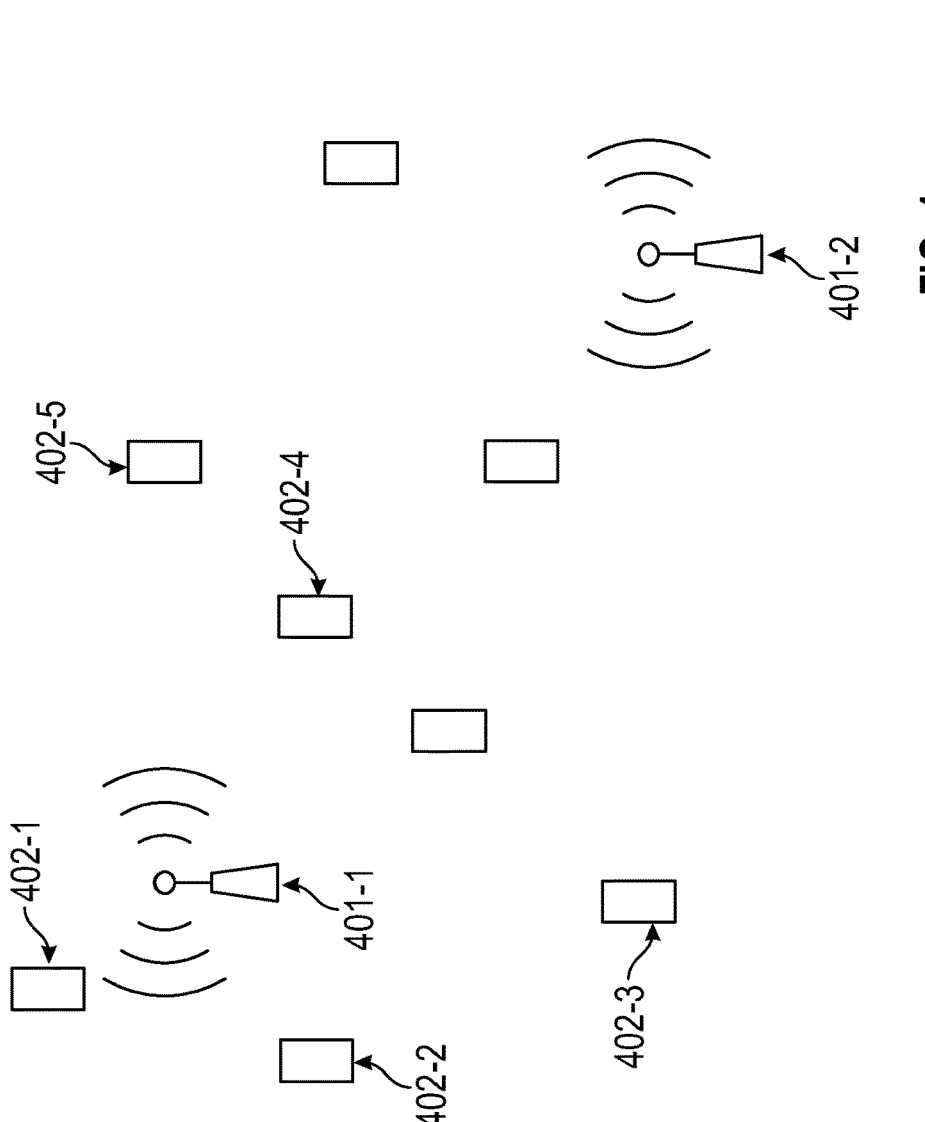

FIG. 4 illustrates an additional embodiment. FIG. 4 uses the value "n". The value "n" indicates that there are a finite number of items but also that there are numerous items. The use of the value "n" is consistent with its application in mathematics to designate a large but finite number of items. For example, FIG. 5 designates a third AP as "401-*n*." The use of "401-*n*" indicates that the number "n" includes a number of APs that can exceed three but is a defined number of numerous APs. APs 401-1 thru 401-$n$ and STAs 402-1 thru 402-$n$ form a wireless network 400. Although three APs are depicted in FIG. 4, any finite number of APs can be deployed in wireless network 400. AP 401-1 communicates with STAs 402-1 thru 402-5. Although five STAs are depicted as communicating with AP 401-1 any finite number of STAs can communicate each of the APs. An AP and its associated STAs can form a node in the larger wireless network 400. APs 401-1 thru 401-$n$ schedule data transmissions from STAs 402-1 thru 402-$n$ as described in FIG. 3 and set forth herein. For example, AP 401-1 deploys the data transmission scheme set forth in FIG. 3. AP 401-1 can schedule the plurality of transmit opportunities with an optional MU-RTS trigger 302, an optional CTS message 303, and a matrix 301. The MU-RTS trigger 302 may be separated from the CTS message 303 by a short inter-frame space (SIFS) 309. SIFS denote the amount of time in microseconds for a wireless interface to process a received frame. The CTS message 303 may also be separated from the matrix 301 by a second SIFS 310. In the event that transmissions are lost, APs 401-1 thru 401-$n$ and STAs 402-1 and 402-$n$ can re-transmit data as described with respect to FIG. 3 and as set forth herein.

Figure 5:
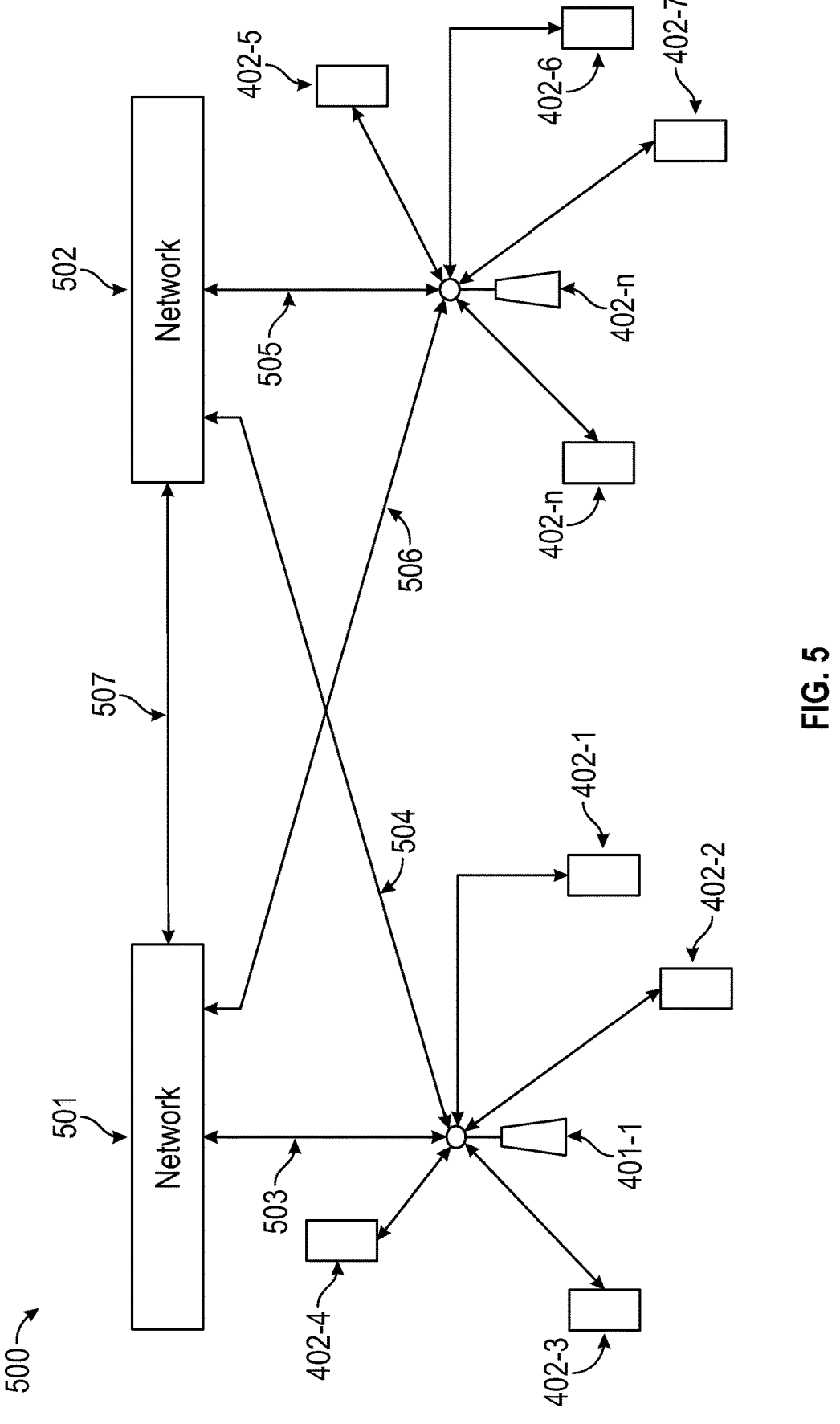
FIG. 5 illustrates a communication network according to an embodiment of the current disclosure.

FIG. 5 illustrates an additional embodiment. APs 401-1 thru 401-$n$ and STAs 402-1 and 402-$n$ may also be part of a larger communication network 500. APs 401-1 thru 401-$n$ and STAs 402-1 thru 402-$n$ form a wireless network 400. An AP and its associated STAs can form a node in the larger wireless network. APs 401-1 thru 401-$n$ schedule data transmissions from STAs 402-1 thru 402-$n$ as described in FIGS. 3 and 4 and set forth herein. Each of APs 401-1 thru 401-$n$ can communicate with networks 501 and 502. For example, AP 401-1 communicates with network 501 through communication medium 503. AP 401-1 can also communicate with network 502 through communication medium 504. Similarly, AP 401-$n$ can communication with network 502 through communication medium 505 and can also communicate with network 501 through communication medium 506. Finally, Networks 501 and 502 can communicate with each other through communication medium 507. Networks 501 and 502 include the hardware and software necessary to form a network for data transmission. For example, networks 501 and 502 include hardware such as routers, switches, transmission lines, data centers, severs, and other hardware necessary to form a communication network. Networks 501 and 502 also include all necessary hardware for APs and STAs to connect to and communicate over the Internet. Communication mediums 503, 504, 505, 506, and 507 can be either wireless or wired.

By increasing the flexibility and density of the data frames, eliminating overhead, and increasing the determinism of the data frames the embodiment described herein are an improvement over known systems and methods. These goals are reached by scheduling that uses a flexible scheduling matrix to provide complete information to an AP that explains who is sending what data and when that data will be sent.

FIG. 6 illustrates a method 600 embodiment of the device set forth in FIG. 3. Method 600 includes the elements in FIGS. 3-5. At block 601, the AP transmits a first message (e.g., the trigger 302) to a STA (e.g., one of STAs 501-1 thru 501-$n$) indicating a fixed duration in a first RU that the STA can use to transmit data to the AP. The first message can include a matrix 301 defining a plurality of RUs 305-308 that the plurality of STAs 501-1 thru 501-$n$ are assigned to transmit or receive data simultaneously for a fixed duration.

At block 602, after transmitting the message to the STA, the AP receives traffic in the first RU from the STA having a fragment flag 304, the fragment flag 304 indicating the STA sent an incomplete packet 312 during the fixed duration. Fragment flag 304 indicates the STA sent an incomplete packet 312 during the fixed duration TXOP defined by matrix 301. At block 603, the AP transmits a second message (e.g., a second MU-RTS trigger 326) to the STA indicating a second fixed duration in a second RU 306 that the STA can use to transmit the remaining portion in the time slot 315 of the packet to the AP.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claims. Likewise, reference to "the invention" shall not be construed as a generalization of any inventive subject matter disclosed herein and shall not be considered to be an element or limitation of the appended claims except where explicitly recited in a claims.

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a non-transitory computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An access point (AP) comprising:
a transmitter configured to:
transmit a first message to a station (STA) indicating a first fixed duration in a first resource unit (RU) that the STA can use to transmit data to the AP;

receive, after transmitting the first message to the STA, traffic in the first RU from the STA having a fragment flag, the fragment flag indicating the STA sent an incomplete packet during the first fixed duration, wherein the fragment flag is transmitted at an end of the first RU; and
transmit a second message to the STA indicating a second fixed duration in a second RU that the STA can use to transmit a remaining portion of the packet to the AP.

2. The AP of claim 1, wherein the first and second RUs are a same frequency band.

3. The AP of claim 1, wherein the first and second RUs are different frequency bands.

4. The AP of claim 1, wherein the first RU comprises the first fixed duration for the STA and a third fixed duration for a second STA to use to transmit data to the AP.

5. The AP of claim 1, wherein the transmitter is configured to:
before receiving the fragment flag, receive a preemption flag from the STA indicating the STA is switching between transmitting different priority traffic within the first fixed duration of the first RU.

6. The AP of claim 5, wherein the traffic is prioritized based on classification of the data as one of express, non-express, or deterministic.

7. The AP of claim 6, wherein the first message comprises a trigger frame scheduling transmission of data for a first transmission opportunity of the first fixed duration and the second message comprises an echo trigger frame scheduling transmission of data for a second transmission opportunity of the second fixed duration that is shorter than the first fixed duration.

8. A method of data transmission, executed by an AP comprising:
transmitting a first message to a station (STA) indicating a first fixed duration in a first resource unit (RU) that the STA can use to transmit data to the AP;
receiving, after transmitting the first message to the STA, traffic in the first RU from the STA having a fragment flag, the fragment flag indicating the STA sent an incomplete packet during the first fixed duration, wherein the fragment flag is transmitted at an end of the first RU; and
transmitting a second message to the STA indicating a second fixed duration in a second RU that the STA can use to transmit a remaining portion of the packet to the AP.

9. The method of claim 8, wherein the first and second RUs are a same frequency band.

10. The method of claim 8, wherein the first and second RUs are different frequency bands.

11. The method of claim 8, wherein the first RU comprises the first fixed duration for the STA and a third fixed duration for a second STA to use to transmit data to the AP.

12. The method of claim 8, further comprising, before receiving the fragment flag:
receiving a preemption flag from the STA indicating the STA is switching between transmitting different priority traffic within the first fixed duration of the first RU.

13. The method of claim 12, wherein the traffic is prioritized based on classification of the data as one of express, non-express, or deterministic.

14. The method of claim 13, wherein the first message comprises a trigger frame scheduling transmission of data for a first transmission opportunity of the first fixed duration and the second message comprises an echo trigger frame scheduling transmission of data for a second transmission opportunity of the second fixed duration that is shorter than the first fixed duration.

15. A non-transitory computer-readable medium containing computer program code that, when executed by operation of one or more computer processors, performs an operation comprising:

transmitting a first message to a station (STA) indicating a first fixed duration in a first resource unit (RU) that the STA can use to transmit data to an AP;

receiving, after transmitting the first message to the STA, traffic in the first RU from the STA having a fragment flag, the fragment flag indicating the STA sent an incomplete packet during the first fixed duration, wherein the fragment flag is transmitted at an end of the first RU; and transmitting a second message to the STA indicating a second fixed duration in a second RU that the STA can use to transmit a remaining portion of the packet to the AP.

16. The non-transitory computer-readable medium of claim 15, wherein the first and second RUs are a same frequency band.

17. The non-transitory computer-readable medium of claim 15, wherein the first and second RUs are different frequency bands.

18. The non-transitory computer-readable medium of claim 17, wherein the first RU comprises the first fixed duration for the STA and a third fixed duration for a second STA to use to transmit data to the AP.

19. The non-transitory computer-readable medium of claim 18, wherein the operation further comprises, before receiving the fragment flag:

receiving a preemption flag from the STA indicating the STA is switching between transmitting different priority traffic within the first fixed duration of the first RU.

20. The non-transitory computer-readable medium of claim 19, wherein the first message comprises a trigger frame scheduling transmission of data for a first transmission opportunity of the first fixed duration and the second message comprises an echo trigger frame scheduling transmission of data for a second transmission opportunity of the second fixed duration that is shorter than the first fixed duration.

* * * * *